Dec. 9, 1958  A. R. DAVIS  2,864,035
FLUORESCENT LIGHT DIMMING
Filed Dec. 23, 1955  5 Sheets-Sheet 1

INVENTOR.
ARIEL R. DAVIS
BY
Frank A. Bower
ATTORNEY

Dec. 9, 1958　　　A. R. DAVIS　　　2,864,035
FLUORESCENT LIGHT DIMMING
Filed Dec. 23, 1955　　　5 Sheets-Sheet 2

INVENTOR.
ARIEL R. DAVIS
BY
Frank A. Powers
ATTORNEY

Dec. 9, 1958  A. R. DAVIS  2,864,035
FLUORESCENT LIGHT DIMMING
Filed Dec. 23, 1955  5 Sheets-Sheet 3

INVENTOR.
ARIEL R. DAVIS
BY
Frank C. Bauer
ATTORNEY

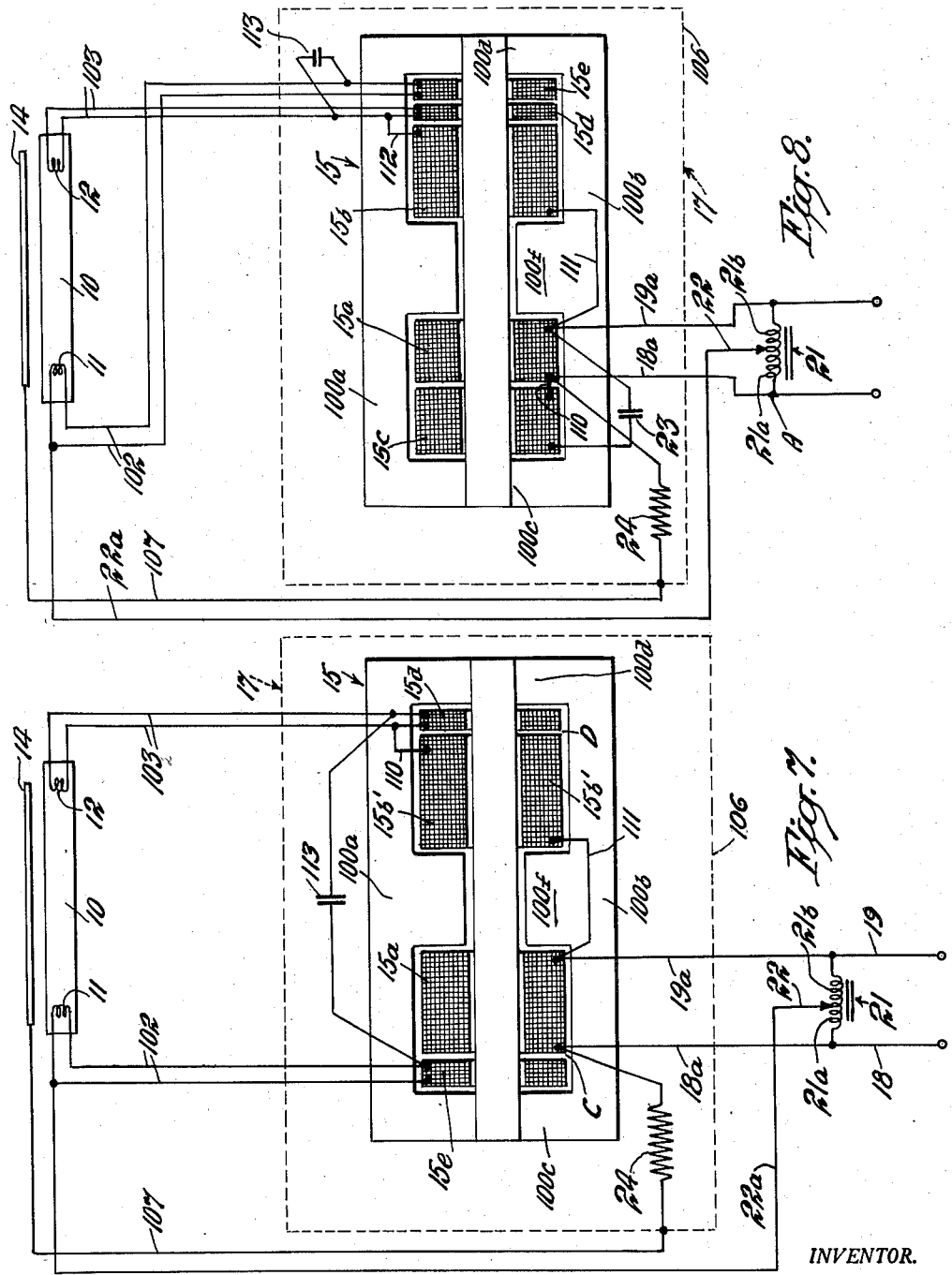

Dec. 9, 1958

A. R. DAVIS 2,864,035

FLUORESCENT LIGHT DIMMING

Filed Dec. 23, 1955

INVENTOR.
ARIEL R. DAVIS
BY
Frank A. Bauer
ATTORNEY

United States Patent Office 2,864,035
Patented Dec. 9, 1958

2,864,035

FLUORESCENT LIGHT DIMMING

Ariel R. Davis, Salt Lake City, Utah

Application December 23, 1955, Serial No. 555,139

2 Claims. (Cl. 315—97)

This invention relates to fluorescent lighting and particularly to the control of the intensity of illumination.

This application is a continuation-in-part of my copending application Serial No. 397,191, filed November 30, 1953, for "Fluorescent Light Dimming," now abandoned.

In the dimming of fluorescent lamps I have found that the intensity of illumination can be accurately and smoothly controlled over the range from full brilliance to dimout by the proper relationship between the current through the lamp and the voltages between the cathodes of the lamp and conductive ignition means adjacent to the cathodes.

An object of the invention is to provide for the dimming of fluorescent lights in a smooth and effective manner through a wide range of illumination.

Another object of the invention is to provide a fluorescent tube starting and dimming control system which is simple and inexpensive in first cost and economical and dependable in operation.

Another object of the invention is to uniformly and simultaneously control the intensity of illumination of a plurality of fluorescent lamps from a single control.

Other and further objects will appear from the following specification taken in connection with the accompanying drawings in which:

Fig. 7 is a schematic diagram of a low power factor ballast connected in the circuit in accordance with the embodiment of Fig. 3;

Fig. 8 is a schematic diagram of a high power factor ballast connected in the circuit in accordance with the embodiment shown in Fig. 4;

Figure 1:
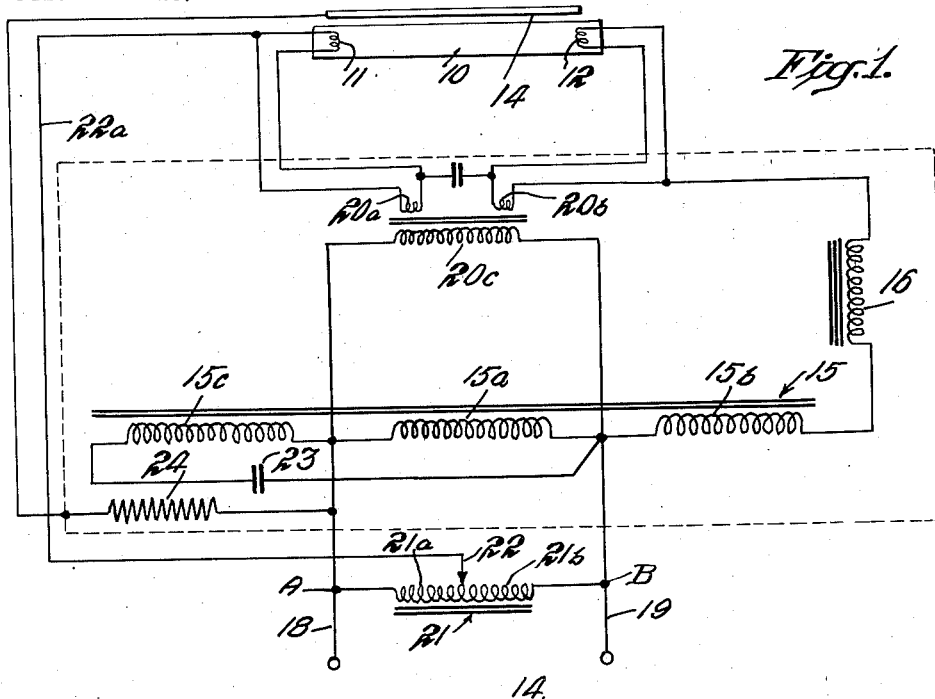
Fig. 1 illustrates a high power factor circuit with the electrical elements separately shown.

In the drawings circuits and apparatuses are shown for dimming conventional fluorescent lamps. The lamp comprises a cylindrical glass envelope with a phosphorescent coating of zinc beryllium silicate and magnesium tungstate and filled with an inert gas, preferably argon, at a pressure of about 3.5 mm. of mercury and a small quantity of mercury vaporizing to a low pressure of the order of 10 microns. The filaments or cathodes 11, 12 may be of the oxide coated type and preferably in the form of coil tungsten wire activated with alkaline earth metal oxides.

In the drawings a fluorescent lamp 10 has cathodes 11 and 12 at opposite ends and is connected to an electrical circuit or means 13 for setting the intensity of illumination of the lamp from full brilliance to dimout. The electrical control circuit is also connected to a conductive means or ignition strip 14 adjacent the fluorescent lamp to assist in the maintenance of the arc current. The electrical control means comprises a ballast 17a and a variable voltage means 21, such as a variable inductance, a variable autotransformer or the like, to vary the voltage applied to the system. The ballast provides a variable impedance to balance the circuit as the impedance of the lamp changes with the arc current therethrough. A winding in the ballast is connected across supply lines to provide the flux for the filament windings and the ballast winding. The winding of the variable voltage means is connected across the supply lines.

The ignition strip 14 is connected to the power line 18 by the line 22a. The line 18 and strip 14 are at ground or neutral to minimize the hazard of shock or short circuit. The ignition strip 14 may be a metallic strip or a metal foil secured to the outside of the glass envelope of the lamp or may be the metal fixture or reflector mounted with the lamp. The metallic strip should preferably extend the full length of the lamp between the cathodes and overlap the cathodes to reduce the distance between the cathodes and the metallic strip. The short gap between the metallic strip 14 and the cathodes 11, 12 creates a high voltage flux gradient in the ends of the lamp on the application of voltages between the cathodes and the metallic strip. The electrical control circuit 13 provides the proper relation between the cathode-strip voltages and the arc current through the lamp to maintain an arc current at any value and insure the ignition of the lamp at any value of the arc current. Thus the lamp may be gradually lowered in intensity and at each level a steady arc current is maintained and the illumination of the lamp is uniform along the length of the lamp and is steady and constant. Also the lamp is readily ignited at any level of the intensity of illumination at which the circuit may be set. At dimout an arc current of diminutive value passes through the lamp or may be ignited in starting the lamp.

In Fig. 1 the arc current path comprises the line 19, transformer winding 15b, ballast choke 16, cathode 12, lamp 10, cathode 11, line 22a, slider 22 and winding 21a to terminal A or line 18. The choke 16 limits the arc current through the lamp. The voltage impressed by the winding portion 21b of winding 21 between the slider 22 and line 19 and the voltage of the winding 15b is divided between choke 16 and lamp 10. When the winding portion 21b is reduced by moving the slider towards line 19 the voltage across the choke 16 is reduced. The reduction in voltage appears as a reduced arc current through the arc current path. Dimout conditions are reached when the slider 22 is at line 19.

The lamp 10 is at full brilliance when the voltage across the winding 21b is maximum and the slider is at line 18 or terminal A. The voltage of the winding 21b and winding 15b is placed across the lamp 10 and choke 16. When the slider 22 is at terminal A the lamp is at full brilliance and a high current passes through the lamp 10. The starting strip 14 is connected to the terminal A of the grounded line 18 through the resistor 24. The cathode 11 is at the same potential as the metallic strip 14 since the slider 22 is at the potential of line 18. Therefore no starting flux is created in the intervening space. The voltage between the cathode 12 and the metallic strip is determined by the voltage across the windings 15a, 15b.

When the slider 22 is at terminal B the voltage impressed across the choke 16 and the lamp 10 is determined by the winding 15b which is substantially less than the combined voltage of winding 21 and winding 15b. The reduced voltage reduces the arc current and the lamp is at dimout. The potential between the cathode 12 and the metallic strip 14 is substantially the same since the voltage of winding 15a is not reduced with the slider 22 at the terminal B. The potential between the cathode 11 and the metallic strip 14 changes with the setting of the slider 22. With the cathode 11 connected to the slider 22 the potential between the cathode 11 and the strip 14 is determined by the winding portion 21a between terminal A and the slider 22. At dimout the winding portion 21a extends the length of the transformer 21 and applies a voltage in the order of the line voltage between the cathode 11 and the metallic strip 14. Thus with a decrease in the arc current the potential between the cathode 11 and the metallic strip 14 increases and with an increase in the arc current the potential between the cathode 11 and the metallic strip 14 decreases. At dimout there is a substantial voltage between the strip and the cathode 11. The short space between the cathode 11 and the strip produces a high gradient electric field therebetween. The high gradient voltage field between cathode 12 and strip 14 exists at all positions of the slider 22. Therefore, at dimout there is a high gradient field at each end of the lamp to facilitate the ionization of the gases in the lamp and the starting of the lamp.

The voltage across the portion 21a of the winding is impressed across the cathode 11 and strip 14. The cathode-strip voltage of cathode 12 and strip 14 is substantially equal to the voltage across windings 15a and 15b. If 120 volts is impressed across lines 18 and 19 approximately 200 volts will appear between the cathode 12 and the strip 14. A voltage across the lamp is approximately 104 volts or above. A slight glow appears at each end of the lamp and a very feeble arc appears between the cathodes 11 and 12. The arc, however, is maintained and the lamp will glow faintly. The ignition or metallic strip shortens the discharge gap and a lower starting voltage across the cathodes is possible. At normal line voltages winding 15b has a voltage slightly above the arc voltage in order to start the lamp when the slider 22 is at terminal B. At these lower voltages both cathodes should glow to overcome the arc gap of the lamp.

A separate filament transformer 20 is provided with a primary winding 20c connected across lines 18, 19 and separate filament transformer windings 20a and 20b are provided for the continuous heating of the cathodes to a red glow.

It is preferable to have the slider 22 vary the intensity of illumination uniformly and evenly over the full range of brilliance. The value of the filament voltage contributes to the smoothness of the illumination change. If the filament voltage is too high, the illumination drops rapidly at the lower intensity levels on dimming and if the filament voltage is too low, the lower level range of illumination is extended and the lamp changes rapidly in illumination intensity at the high brilliance end as the cathode is heated by ionic bombardment with the increase of current across the lamp. The voltage of the filaments is set to provide an even change in the intensity of illumination. The winding 15c is wound on the ferromagnetic core with windings 15a and 15b and condenser 23 connected across windings 15a and 15c to raise the power factor of the circuit to above 90%. With the winding 15c and condenser 23 omitted, the circuit has a low power factor.

Figure 2:
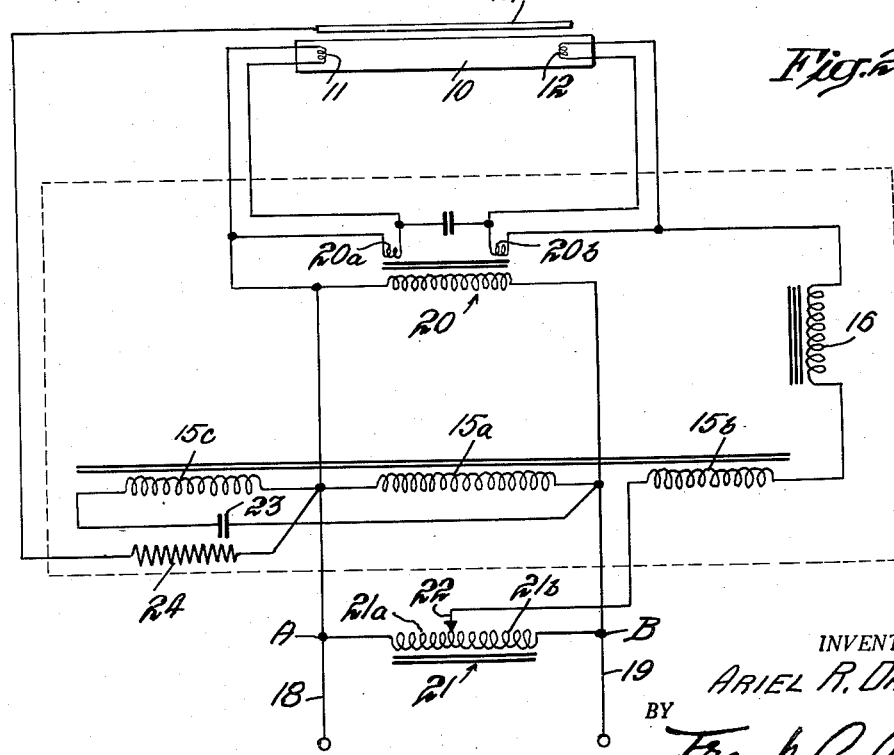
Fig. 2 is a diagram illustrating another embodiment of the invention having a high power factor ballast with the electrical elements separately shown.

In Fig. 2 a circuit electrically equivalent to the circuit in Fig. 1 is illustrated. The winding 15b, ballast choke 16 and lamp 10 are connected across the variable voltage means. The winding 15b is connected to the slider 22 instead of line 19 as in Fig. 1. The cathode 11 is connected to line 18 through resistor 24. The cathode 11 may be connected through the resistor 24 and winding 15c to provide a voltage at all times between the strip and the cathode. The voltage across the cathodes is then determined by the voltage across portion 21a, winding 15b and the voltage drop across the choke 16. In this embodiment the slider 22 moves over the winding of the transformer 21 to change the intensity of illumination over the entire range. At position A only the voltage across the winding 15b is impressed across the ballast choke 16 and the lamp 10. The cathode 11 is connected to line 18, and slider 22 is at terminal A on line 18. At position B the slider 22 is at full bright since the voltage of winding 21 and winding 15b is across the ballast choke 16 and lamp 10. The voltages of winding 15b and winding 21 may be of such values as to require only a portion of the winding to be traversed by the slider 22.

A winding 15c is connected to line 18 at one end and wound on the same ferromagnetic core with the winding 15a and magnetically coupled therewith. A condenser 23 is connected across the windings 15a and 15c. The conductive strip may be connected to the free end of the winding 15c. However, it is preferable to connect to the ground line 18 so that it will not cause any shocks. A resistor 24 connects the conductive strip to the grounded line 18 through the winding 15c.

The filament transformer 20 supplies current for heating the cathodes 11 and 12 and is connected across lines 18 and 19. The resistor or impedance 24 has a high resistance connecting the starting strip to the cathode to apply a voltage to the strip and limit the current to reduce the danger of shock or accidental contact with the conductive means 14. The value of this resistance is preferably of the order of one-half of a megohm or more.

In Figs. 1 and 2 the electrical elements are resolved into the various electrically equivalent parts for the purpose of explanation of the operation of the invention. In the apparatus used to dim fluorescent lamps various elements are combined. In Figs. 7–10 various types of ballasts are schematically illustrated. These ballasts include all the electrical compounds except the lamp, the starting strip and the variable voltage means. The ballasts are enclosed in the casings and have leads extending therefrom for attachment to the lamp, starting strip and the variable voltage means. The connection of the elements of the ballast is diagrammatically shown in Figs. 3–6.

Various types of cores may be used to provide a ballast winding varying in impedance with changes in arc current therethrough. The cores have a high leakage flux. In Figs. 7–10 the cores comprise two E-shaped members and a central rectangular member fitting between the E-shaped members forming spaces C and D for the windings. The members are made of laminated ferromagnetic steel. The E-shaped pieces are clamped together on opposite sides of the central member to form outer legs 100c and 100d and a central leg 100f. Sides 100a and 100b connect the outer legs and central leg. The center leg 100f has a high flux leakage to render the impedance of the ballast winding 15b' variable in response to arc current changes. The legs may be made in a piece with the center leg split and the core press-fitted between the outer legs and completing the magnetic path between the section of the center leg.

Figure 3:
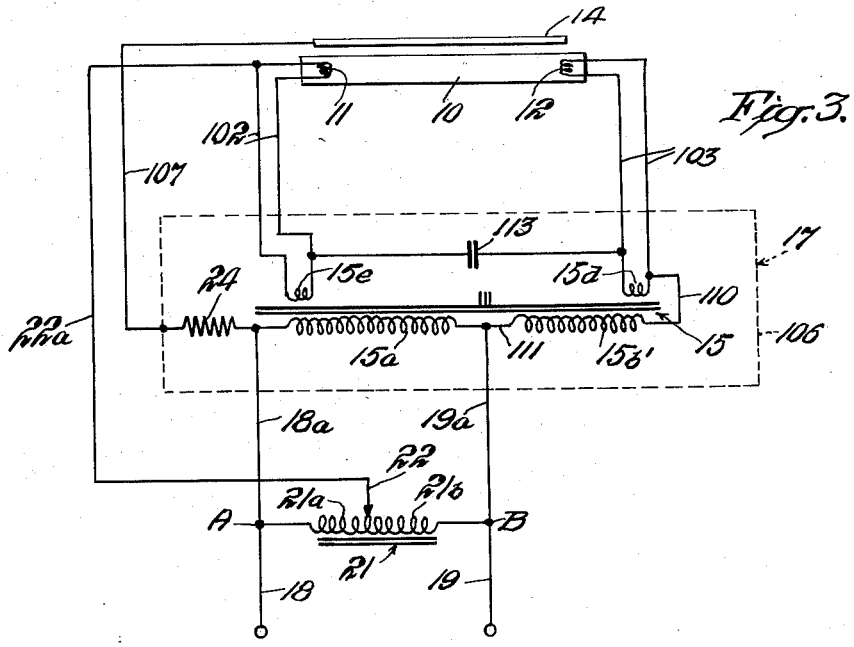
Fig. 3 is a circuit diagram of the improvements of the apparatus in accordance with the embodiment of Fig. 1 utilizing a low power factor ballast.

In Figs. 3 and 7 a circuit with a low power factor ballast is shown connected in accordance with the principles of the embodiment shown in Fig. 1. The transformer winding 15a is positioned in space C and the ballast winding 15b' is positioned in space D. The filament windings 15d and 15e are positioned in spaces D and C, respectively. The transformer winding 15a has leads 18a and 19a connected at opposite ends of the winding for connecting the transformer winding 15a to the supply lines 18 and 19 and across the winding of variable autotransformer 21. The ballast winding 15b' constituting the combination of windings 15b and choke 16 is connected at one end to the lead 19a and at the other end to the filament winding 15d which has leads 103 for connecting the filament winding 15d and the end of the ballast winding 15b' to the cathode 12. The filament winding 15e is separate from the windings 15a, 15b', and 15d and has leads 102 for connecting the winding to the cathode 11. In Fig. 3 the circuit is schematically shown, and Fig. 7 diagrammatically shows the ballast. The ballast winding is connected to the leads 103 by an extension 110 of the winding 15b', and the other end is connected by the extension 111 to the lead 19a. The windings 15d and 15e instead of being in separate spaces may be wound in the same space such as space D with the winding 15b'.

The resistor 24 is in the ballast casing and is connected between the end of the winding 15a connected to the lead 18a and the casing 106 indicated in dotted lines. A radio interference condenser 113 is connected between the terminals on the ballast of the leads 102 and 103. The condenser is inside the casing 106. The casing is mounted on the lamp fixture which may be used as the starting strip. The casing is in electrical contact with the fixture or strip as indicated by the line 107 connected to the casing 106 from the starting strip 14. The arc current path from the line 19 through lead 19a, winding 15b', leads 103, through lamp 10 is completed by a line 22a connected between the leads 102 and the slider 22 on the autotransformer 21.

In the diagrammatical illustration of the apparatus in Fig. 7 of the circuit in Fig. 3 the ballast is of the type described hereinbefore with the winding 15a wound with the filament winding 15e in space C and with the ballast winding 15b wound with the filament winding 15d in space D. The winding 15a has leads 18a and 19a connected thereto for connecting the winding across the supply lines 18 and 19. The resistor 24 is connected between line 18a (grounded) and the casing. The resistor 24 is connected to the conductive member by mounting the ballast adjacent or in electrical contact with the conducting strip. The ballast winding is connected to the end of winding 15a by lead 111. The other end is connected by line 110 to one of the filament leads 103. The interference elimination condenser 113 is connected between the terminals of the respective leads of the ballast. The arc current path is the line 19, lead 111, winding 15b', lead 103, lamp 10, line 22a to the variable voltage means 21. The windings 15b and 15d may be connected internally within the coil or externally as indicated in the drawing.

Figure 4:
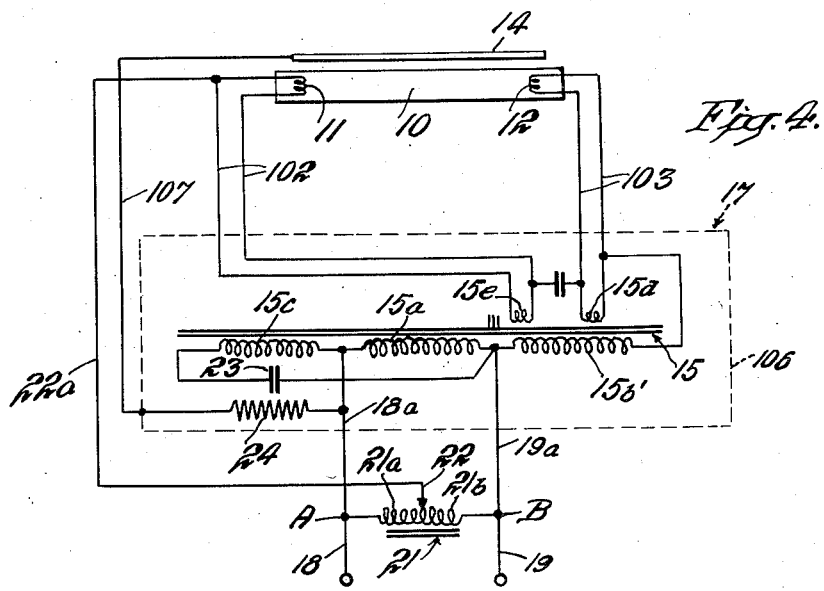
Fig. 4 is a circuit diagram of the components of the apparatus in accordance with the embodiment of Fig. 1.

Figs. 4 and 8 illustrate embodiments having high power factor ballasts. This embodiment is similar to the embodiment in Fig. 1 with an additional winding 15c and a condenser across windings 15a, 15b'. In Fig. 8 a high power factor ballast circuit is shown. The filament windings 15d and 15e are wound in space D with the ballast winding 15b'. The ballast winding is connected to the lead 19a by line 111 and to the winding 15e by the lead 112. The resistor 24 is connected to lead 18a at the winding 15a. The winding 15c is connected to the winding 15a by lead 110 extending from the winding. The condenser 23 is connected across the windings 15a and 15c.

The windings and condensers may be interconnected differently without departing from the essential elements of the embodiment. The connections of windings 15a, 15c may be changed. The lead 19a may be connected to winding 15b' and to winding 15c at the winding 15a end. The lead 18a is connected to the end of winding 15a opposite to the end connected to winding 15c. The resistor 24 and the condenser 23 are connected to the line 18a. The condenser bridges across the windings 15a and 15c. In the space D the winding 15b' and filament winding 15d are wound one on another with a lead 112 interconnecting them. The radio interference elimination condenser 113 is connected between one of the leads 103 and the lead 18a. This carries the interference from the lamp to ground.

Fig. 4 illustrates diagrammatically the essential components of the ballast and variable voltage means. The laminated ferromagnetic core 15 of the ballast has a high leakage flux to provide a wide impedance variation with arc current to compensate for the negative impedance of the lamp. The variable impedance of the choke winding 16 appears in the winding 15b'. The filament windings are coupled to the transformer winding 15b. The arc current passes from line 19 through the variable impedance winding to the filament winding 15d through the lamp 10 and thence through a lead 22a to the variable voltage control means. In Fig. 3 a low power factor ballast is utilized. The filament windings 15d, 15e are coupled to the transformer winding 15a and the ballast choke 16 is combined with the winding 15b' to form a variable impedance winding.

Figure 6:
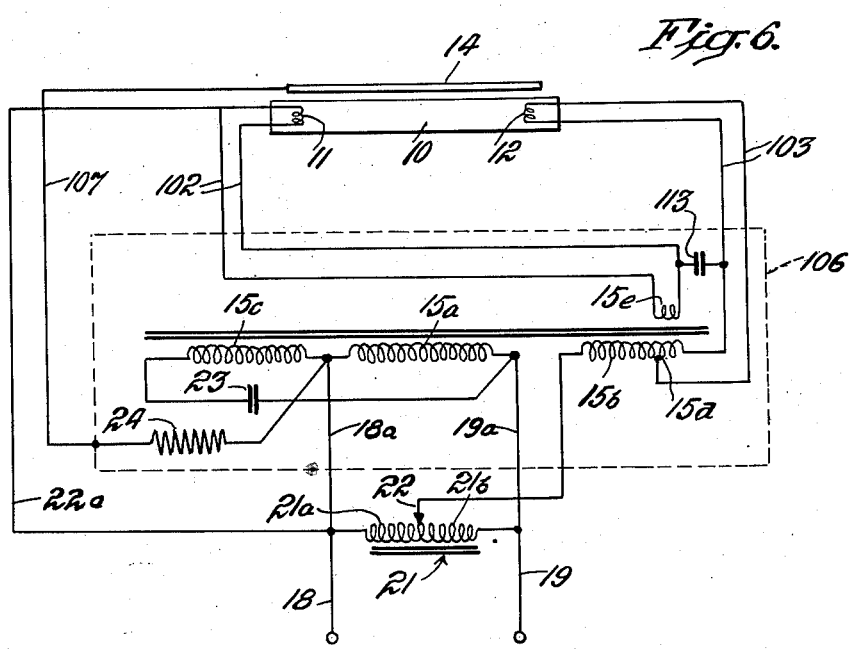
Fig. 6 is a circuit diagram of the components of the apparatus in accordance with the embodiment of Fig. 2.
Figure 9:
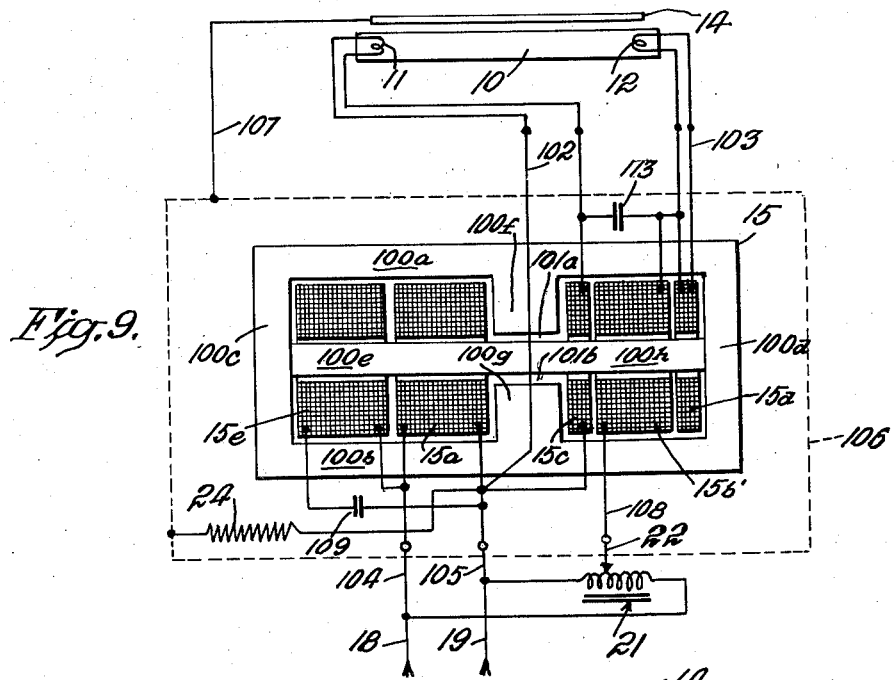
Fig. 9 is a schematic diagram of a high power factor ballast connected in the circuit in accordance with the embodiment shown in Fig. 6.

In Fig. 6 a circuit is diagrammatically shown which corresponds to the embodiment of Fig. 2. The first coil or winding 15c has the innermost end connected to the grounded line 18a and winding 15a. The winding 15a is connected across lines 18a and 19a. The condenser 23 is connected across the windings 15a and 15c. The winding 15c is connected between line 18a and condenser 23. The resistor 24 is connected between the juncture of the windings 15a, 15c and line 18a and the casing 106. The winding 15b' is in the space on the other side of the center leg from the windings 15a, 15c, as illustrated in Fig. 9. The winding 15b' is wound on the rectangular piece of the core with the innermost end connected to the variable contact 22. At the other end of the winding filament leads 103 are tapped at spaced points to form a filament winding 15d connected to the end of the winding 15b'. A second winding 15e is wound separately from the winding 15b'. The filament winding 15e is connected by line 102 to the cathode 11 of the lamp. The cathode 11 is connected by line 22 to line 18.

The windings and condensers may be interconnected differently without departing from the embodiment shown in Fig. 6. The connection of the lines 18a and 19a may be reversed so that line 19a is connected at the junction of windings 15a and 15c and line 18a is connected to the end of winding 15a. The resistor 24 is then connected to line 18a and is therefore connected to the end of the winding 15a opposite from the winding 15c. The filament windings 15d and 15e may be coupled to the main winding 15a. The winding 15d is electrically isolated from the main winding 15a and connected to the ballast winding 15b' for passing the arc current to the lamp.

The ballast is contained in a metal casing 106 and imbedded in soft tar to isolate the components. The resistor 24 is connected between the casing and the grounded line 18. The casing is fastened to the metal fixture which forms the metal strip extending parallel to the lamp. The fixture or strip is thus connected to the grounded line through the resistor 24. The radio interference elimination condenser 113 is connected between the filament lead connected to the winding 15d and the filament lead connected to the separate winding. This may be connected to the grounded line instead.

A specific embodiment of the apparatus shown in Figs. 2 and 6 is illustrated in Fig. 9. The ballast means comprises a transformer 15 with a ferromagnetic core of laminated steel. The core comprises an outer rectangular shaped ring with two long sides or legs 100a, 100b and two short sides or legs 100c, 100d in opposite ends of the long sides. A central leg with portions 100e, 100h extends parallel to the legs 100a, 100b. The legs 100a, 100b have intermediate stubs 100f, 100g extending to the central leg and spaced therefrom by non-magnetic gaps 101a, 101b. Windings 15a, 15c are wound around the leg 100e on one side of the stubs 100f, 100g and windings 15b', 15c, 15d are wound on leg 100h on the other side of the stubs. The winding 15a is connected across supply lines 18 and 19 by means of leads 104, 105 respectively. With the stubs and gaps as part of the transformer core the impedance effect of winding 15b and choke 16 (Fig. 2) is combined in the winding 15b' to limit the current through the lamp. The cathodes 11, 12 are connected to the windings 15e and 15d by leads 102, 103, respectively, to provide heating current to the cathodes. In Fig. 2 the filament windings are shown coupled to a separate transformer 20 for simplicity of illustration. However, in this embodiment the filament windings 15e and 15d are magnetically coupled to the winding 15b'. The lead 105 is connected to the end of the filament winding 15e and the filament leads 102 connecting the supply line to the cathode 11. The resistor 24 may be connected between the end of winding 15a and the metal casing 106. The conductive or metallic strip 14 extends along the lamp adjacent the cathodes and has a lead 107 connected to the casing. The end of winding 15b' is connected by lead 108 to the contact 22 of the autotransformer 21. The condenser 109 may be connected across the windings 15a, 15e.

Figure 5:
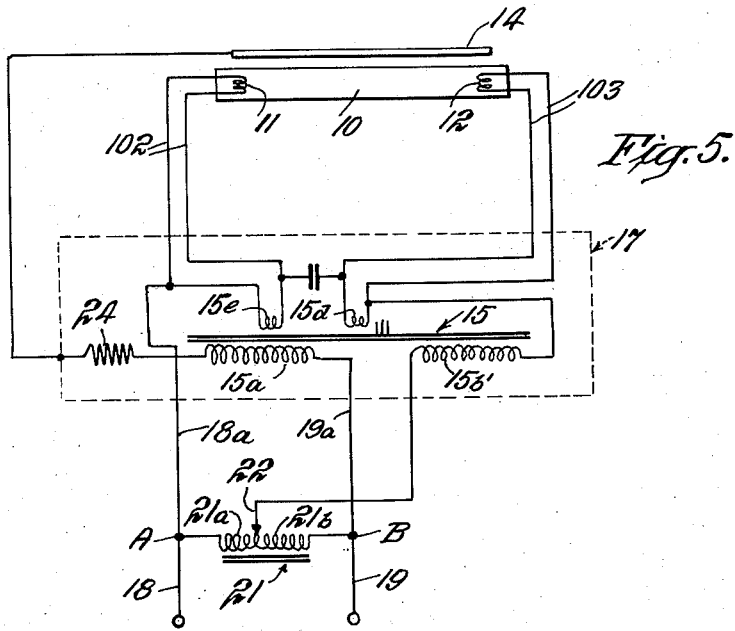
Fig. 5 is a circuit diagram of the components of the apparatus in accordance with the embodiment of Fig. 2 utilizing a low power factor ballast.
Figure 10:
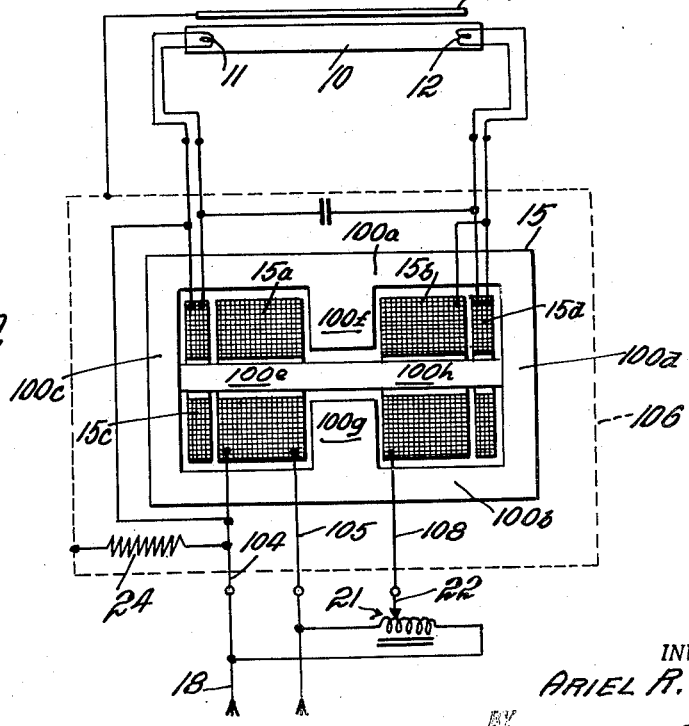
Fig. 10 is a schematic diagram of a low power factor ballast connected in the circuit in accordance with the embodiment shown in Fig. 5.

In Fig. 5 a low power factor dimming circuit is shown with the ballast winding connected directly to the variable voltage tap of the variable autotransformer winding 21 and the cathode 11 connected to lead 18a. The ballast is similar to the low power factor ballast of Fig. 3 except for the aforementioned connection of the winding 15b'. Filament windings 15d and 15e may be wound in spaces A and B as shown in Fig. 9 or may be wound in the same space such as space A with the winding 15a. In Fig. 10 a low power factor ballast is shown with filament windings 15c and 15d at opposite ends of the core 100. Windings 15a and 15c are wound on leg 100e and windings 15b' and 15d are on leg 100h. The ballast is similarly connected except the winding 15e is omitted and resistor 24 is connected to lead 104 which is also connected to the cathode 11.

The scope of the invention as described in the foregoing specification and illustrated in the accompanying drawings is set forth in the apended claims.

I claim:

1. An illuminating apparatus operable from a low frequency alternating voltage supply having two lines and variable in the intensity of illumination over a range from full brilliance to dim-out and comprising a fluorescent lamp having a sealed glass tube containing an inert gas with small quantities of mercury and having first and second heated electrodes at respective ends of the tube, conductive means adjacent the electrodes, a variable transformer connected to one of the lines, means for connecting the first electrode to the other line, a transformer means having a ferromagnetic core with a high leakage flux, a first winding wound thereon and a second winding wound thereon to balance the lamp with changes in current through the lamp, said first winding connected between said first electrode at one end and at the other end connected to the line connected to said variable transformer, said second winding connected at one end to said second electrode and at the other end to said variable transformer to connect said second winding and said lamp in series to vary the voltage thereacross and a high resistance connecting said conductive means to said first winding at the electrode end to provide from said first winding a potential between said second electrode and said conductive means to sustain an arc current through said lamp over the range of illumination.

2. An illuminating apparatus operable from a low frequency alternating voltage supply having first and second input lines variable in intensity over a range from full brilliance to dimout and comprising a fluorescent lamp having a sealed glass tube containing an inert gas with a small quantity of mercury and having first and second heated electrodes at respective ends of the tube, conductive means adjacent the electrodes, a variable transformer having a winding connected across said first and second lines and an adjustable contact engaging said winding, a transformer means having a single ferromagnetic core with a high leakage flux, a first winding wound thereon and a second winding wound thereon to balance the lamp on changes in current through the lamp, said first winding connected across said first and second input lines, said second winding connected from said second line to said second electrode, means for connecting said first electrode to said adjustable contact of the variable transformer to thereby complete the series circuit from said second line through said second winding and said lamp to the adjustable contact of the variable transformer to adjust the voltage impressed across said second winding and said lamp to vary the illumination of the lamp, and a high resistance connecting said conductive means to said first line to provide a potential between said second electrode and said conductive means to sustain an arc current through said lamp over the range of illumination.

References Cited in the file of this patent
UNITED STATES PATENTS

| 2,464,643 | Kulka | Mar. 15, 1947 |
|---|---|---|
| 2,504,549 | Lemmers | Apr. 18, 1950 |
| 2,644,107 | Keiffer | June 30, 1953 |